United States Patent
Chen

(10) Patent No.: US 8,285,254 B2
(45) Date of Patent: Oct. 9, 2012

(54) FEMTOCELL MONITORING SYSTEM AND MONITORING METHOD EMPLOYING THE SAME

(75) Inventor: Ching-Yuan Chen, New Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/193,631

(22) Filed: Jul. 29, 2011

(65) Prior Publication Data

US 2012/0231765 A1    Sep. 13, 2012

(30) Foreign Application Priority Data

Mar. 10, 2011    (CN) .......................... 2011 1 0057311

(51) Int. Cl.
H04M 1/66    (2006.01)
(52) U.S. Cl. .................. 455/411; 455/410; 370/338
(58) Field of Classification Search .................. 455/411, 455/436, 435.1, 422.1, 410, 432.1, 423, 461; 370/338, 329, 331
See application file for complete search history.

(56) References Cited

U.S. PATENT DOCUMENTS

| | | | |
|---|---|---|---|
| 8,019,331 B2 * | 9/2011 | Khetawat et al. | 455/422.1 |
| 8,180,368 B2 * | 5/2012 | Anderson et al. | 455/456.1 |
| 2009/0286510 A1 * | 11/2009 | Huber et al. | 455/410 |
| 2010/0124179 A1 * | 5/2010 | Lee et al. | 370/252 |
| 2010/0216485 A1 * | 8/2010 | Hoole | 455/452.2 |
| 2010/0240397 A1 * | 9/2010 | Buchmayer et al. | 455/456.1 |
| 2011/0223887 A1 * | 9/2011 | Rune et al. | 455/411 |
| 2012/0063415 A1 * | 3/2012 | Yee | 370/331 |
| 2012/0122422 A1 * | 5/2012 | Olsson et al. | 455/410 |

* cited by examiner

Primary Examiner — Jean Gelin
Assistant Examiner — Mahendra Patel
(74) Attorney, Agent, or Firm — Altis Law Group, Inc.

(57) ABSTRACT

A femtocell in electronic communication with different user equipments includes a setting unit, a subscriber identity module (SIM), a signal processing unit and a monitoring unit. The setting unit sets and establishes a monitoring area to monitor all items of user equipment. The SIM stores a whitelist which includes a plurality of identification (ID) codes corresponding to a plurality of items of user equipment. When the ID code of an item of user equipment is not within the whitelist of the SIM, the signal processing unit controls the monitoring unit to establish and monitor the position of the user equipment to determine whether the user equipment is within the predetermined monitoring area.

16 Claims, 4 Drawing Sheets

FEMTOCELL MONITORING SYSTEM AND MONITORING METHOD EMPLOYING THE SAME

BACKGROUND

1. Technical Field

The disclosure generally relates to telecommunications, and more particularly to a femtocell monitoring system and a monitoring method employing the same.

2. Description of the Related Art

A femtocell is a small cellular base station usually designed for use in a home, banks or small business which allows wireless devices to connect to a wired network using BLUETOOTH or WIFI. The femtocell allows the service providers to extend service coverage indoors, especially where access would otherwise be limited or unavailable.

However, in some high-security locations such as banks and laboratories, cameras are forbidden. Thus, electronic devices containing cameras such as smart phones are prohibited in these places. Hence, it is necessary for the femtocell to monitor and check whether any electronic devices are being carried in the coverage area of the femtocell.

Therefore, there is room for improvement within the art.

BRIEF DESCRIPTION OF THE DRAWINGS

Many aspects of a femtocell monitoring system and a monitoring method employing the same can be better understood with reference to the following drawings. The components in the drawings are not necessarily drawn to scale, the emphasis instead being placed upon clearly illustrating the principles of the femtocell monitoring system and the monitoring method employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
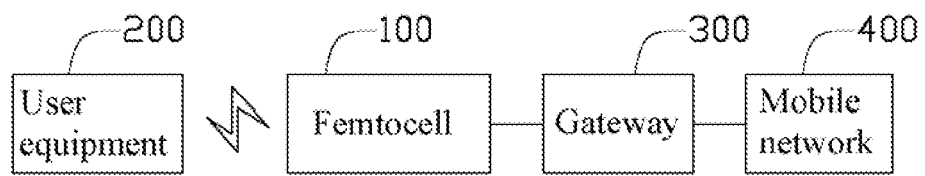
FIG. 1 is a block view of one embodiment of a femtocell monitoring system including a femtocell of the disclosure.

FIG. 1 shows a block view of one embodiment of a femtocell monitoring system including a femtocell 100 of the disclosure. The femtocell 100 is in electronic communication with different types of user equipments 200 via a wireless network, such as a wireless regional area network (WRAN). In this embodiment, the user equipments 200 can be a mobile telephone, a laptop computer equipped with a mobile broadband adapter, other mobile communication terminals, or more than one electronic device.

The femtocell 100 communicates with a gateway 300 via a wireless network or a wired connection to establish a communications connection. The femtocell 100 is further in electronic communication with a mobile network 400 through the gateway 300, so the user equipments 200 can access the mobile network 400 through the femtocell 100 and the gateway 300. In this embodiment, the gateway 300 can be a packet data gateway (PDG) and may be used as a protocol converter for the benefit of protocol servers, in providing protocol conversion, routing and data exchange in relation to communication between the femtocell 10 and the mobile network 400.

The mobile network 400 is capable of providing and delivering voice and data access services to the femtocell 100.

Figure 2:
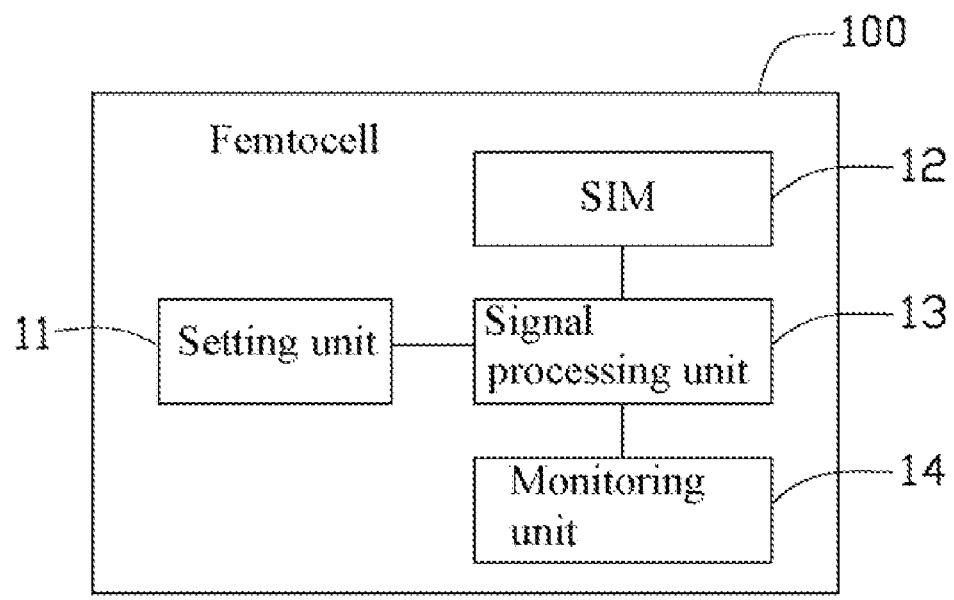
FIG. 2 is a block view of the femtocell shown in FIG. 1 of the disclosure.
Figure 3:
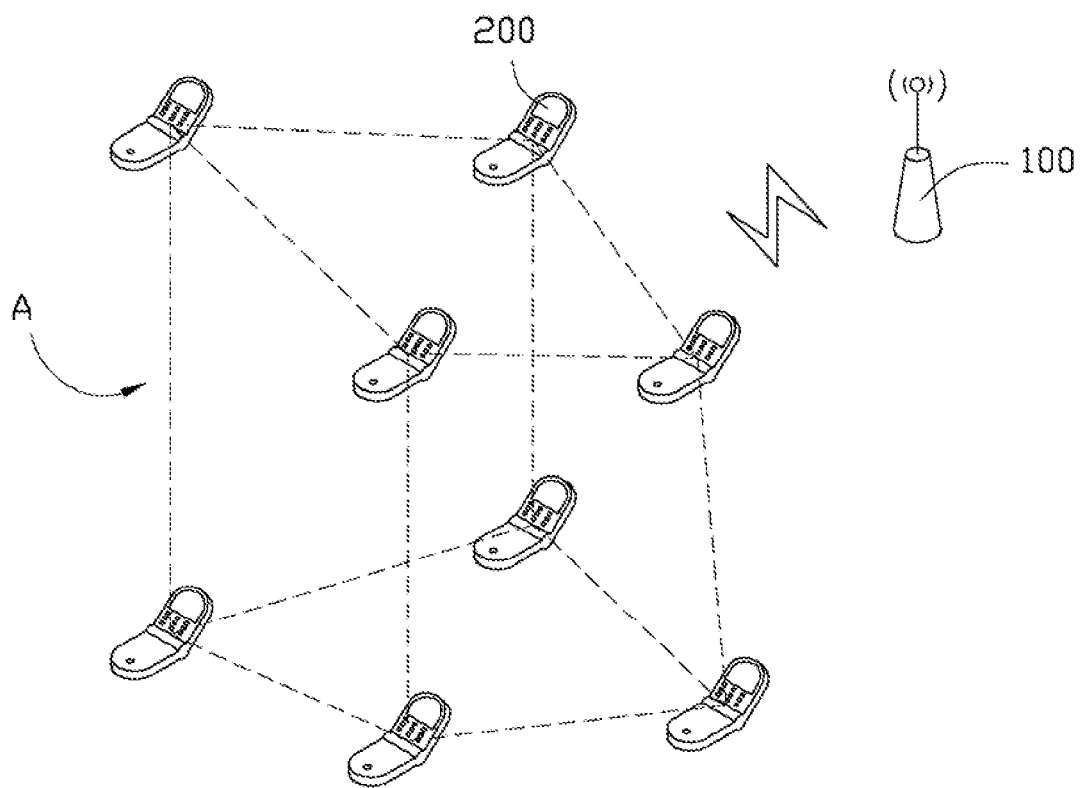
FIG. 3 is a schematic view of a monitoring area formed by the femtocell.

Referring to FIGS. 2 and 3, the femtocell 100 is configured for use in a home, a bank, or a small business, and connects to the service provider's network via a broadband connection, such as a wired connection (e.g. a cable connection), and further allows the service providers to extend their service coverage indoors, especially where access would otherwise be limited or unavailable. In this embodiment, the femtocell 100 includes a setting unit 11, a subscriber identity module (SIM) 12, a signal processing unit 13, and a monitoring unit 14. The signal processing unit 13 is electrically connected to the setting unit 11, the SIM 12 and the monitoring unit 14.

The setting unit 11 can be a keyboard or a touch panel, and is capable of setting and establishing a corresponding monitoring area A to monitor user equipments 200 that enter the monitoring area A. In detail, the user equipments 200 are positioned at predetermined places within the bank or small business to form a three-dimensional monitoring network, and may establish communication with the mobile network 400 through the femtocell 100. The signal processing unit 13 calculates and simulates positions, directions and distances of the valid user equipments 200 using a radio resource control (RRC) protocol and an assisted global positioning system (AGPS) protocol, to form the monitoring area A.

The SIM 12 is an integrated circuit that stores a whitelist or an approved list that identifies entities, such as mobile phones which possess a particular privilege, service, access or other recognized characteristic. The whitelist includes a group of International mobile subscriber identification (IMSI) codes corresponding to the valid user equipments 200 to identify and authenticate the valid user equipments 200, and to deny unrecognized or invalid user equipments. For example, when the IMSI code of a user equipment is in the whitelist, the user equipment is recognized and is allowed to access the monitoring area A.

The signal processing unit 13 can be a central processing unit (CPU) and carries out the functions of the femtocell 100 to control the setting unit 11, the SIM 12 and the monitoring unit 14. In this embodiment, when an item of user equipment (e.g., a mobile phone) enters a predetermined service coverage range of the femtocell 100 and tries to access the mobile network 400 through the gateway 300, the signal processing unit 13 determines whether or not the IMSI code of the user equipment exists in the whitelist, that is, the signal processing unit 13 determines whether or not the item of user equipment is valid. If the IMSI code of the user equipments exists in the whitelist, the femtocell 100 allows the valid user equipments 200 to access the mobile network 400 and establish communication with the mobile network 400 through the femtocell 100 and the gateway 300. Otherwise, the invalid user equipments is denied, and the signal processing unit 13 sends a corresponding control signal to the monitoring unit 14.

The monitoring unit 14 receives the control signal from the signal processing unit 13, and monitors and positions the invalid user equipment according to the control signal to determine whether the invalid user equipment has entered the preset monitoring area A. When an item of invalid user equipment enters the predetermined monitoring area A, the monitoring unit 14 generates and outputs a corresponding warning signal, such as an alarm, to issue an alert to prevent the invalid item of user equipment from entering the monitoring area A. In addition, the monitoring unit 14 can generate and send a message to monitoring persons that an item of invalid user equipment is accessing or attempting to access the monitoring area A.

Figure 4:
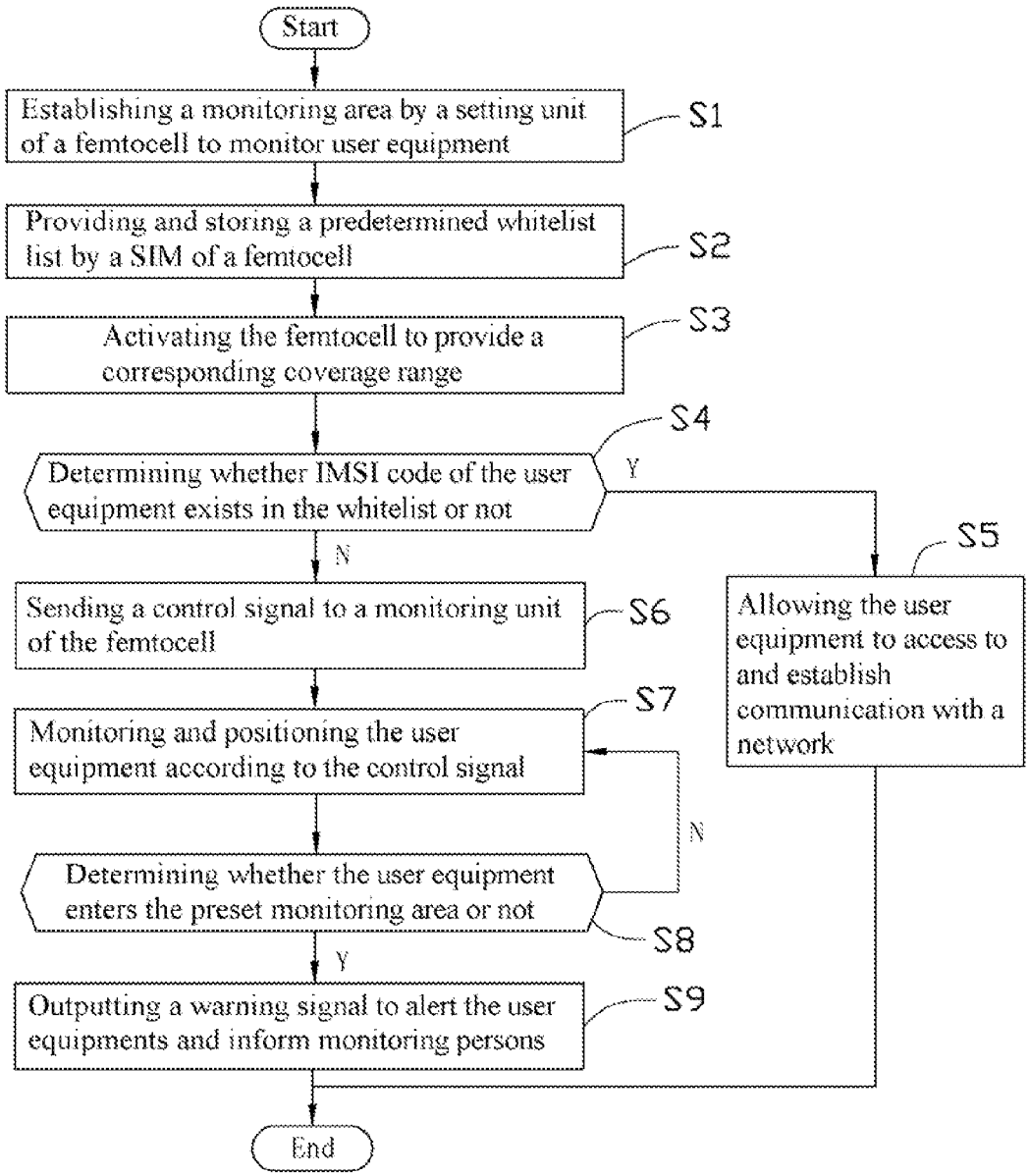
FIG. 4 is a flowchart of a monitoring method, according to an embodiment of the disclosure.

Also referring to FIG. 4, a monitoring method for monitoring and denying the invalid item of user equipments entry to the monitoring area A according to one embodiment of the disclosure is depicted. The monitoring method can use the aforementioned femtocell monitoring system, and may include at least the following steps.

In step S1, the signal processing unit 13 calculates and simulates the positions, directions and distances of the valid item of user equipments 200 using RRC and AGPS protocols, and the setting unit 11 of the femtocell 100 sets and establishes the monitoring area A to monitor any invalid item of user equipment that enters the monitoring area A.

In step S2, a predetermined whitelist is generated and prestored in the SIM 12. The whitelist includes a group of (IMSI) codes corresponding to each item of the user equipments 200 to identify and authenticate the valid user equipments 200 and deny the invalid user equipments.

In step S3, the femtocell 100 is activated and provides a predetermined service coverage range for the item of the user equipments 200.

In step S4, when the user equipment enters the service coverage range of the femtocell 100 and tries to access the mobile network 400 through the femtocell 100, the signal processing unit 13 determines whether the IMSI code of the item of the user equipment exists in the whitelist. If the IMSI code of the user equipment exists in the whitelist, then the method proceeds to step S5; if the whitelist does not include that particular item of the user equipment, then the method proceeds to step S6.

In step S5, the femtocell 100 allows and enables the valid user equipment 200 to access the mobile network 400 and establish communication with the mobile network 400 through the femtocell 100 and the gateway 300.

In step S6, the signal processing unit 13 sends a corresponding control signal to the monitoring unit 14 if the user equipment is invalid and is therefore to be denied.

In step S7, the monitoring unit 14 receives the control signal from the signal processing unit 13, and monitors and establishes the position(s) of the invalid item of user equipment according to the control signal.

In step S8, the monitoring unit 14 monitors and determines whether an invalid item of user equipment has entered the preset monitoring area A. If such an invalid item of user equipment does not enter the predetermined monitoring area A, then step S7 is repeated; if such an invalid item of user equipment has entered the predetermined monitoring area A, then the method proceeds to step S9.

In step S9, the monitoring unit 14 of the femtocell 100 continues to monitor the invalid user equipment, and outputs a corresponding warning signal and/or message to issue an alert concerning the invalid user equipment and informs a or the monitoring person that an invalid item of user equipment is accessing or attempting to access the monitoring area A.

In summary, in the femtocell monitoring system of this disclosure, all valid and recognized user equipments can access and establish communication with the mobile network 400 through the femtocell 100. However, when unrecognized and invalid items of user equipments enter the monitoring area A, the monitoring unit 14 can monitor and establish the position of the invalid user equipments, and output a warning signal and/or message to issue an alert concerning the invalid user equipments and warn and inform a or the monitoring person, which can more effectively protect property and data security.

In the present specification and claims, the word "a" or "an" preceding an element does not exclude the presence of a plurality of such elements. Further, the word "comprising" does not exclude the presence of elements or steps other than those listed.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of this exemplary disclosure to the full extent indicated by the broad general meaning of the terms in which the appended claims are expressed.

What is claimed is:

1. A femtocell in electronic communication with different user equipments, the femtocell comprising:
   a setting unit that sets and establishes a corresponding monitoring area to monitor the user equipments;
   a subscriber identity module (SIM) that stores a whitelist, the whitelist comprising a plurality of identification (ID) codes corresponding to the user equipments;
   a signal processing unit that is electrically connected to the setting unit and the SIM; and
   a monitoring unit that is electrically connected to the signal processing unit, wherein when International mobile subscriber identification (IMSI) code of the user equipment is not in the whitelist of the SIM, the signal processing unit sends a control signal to the monitoring unit, causing the monitor unit to establish and monitor the position of the user equipment and determine whether the user equipment is within the predetermined monitoring area according to the position of the user equipment;
   wherein the femtocell communicates with a gateway though a wireless network or a wired connection to establish a communication connection, the femtocell is further in electronic communication with a mobile network through the gateway, the user equipments can access the mobile network through the femtocell and the gateway, the ID codes are IMSI codes; and
   wherein the user equipments are positioned at corresponding predetermined places to form a three-dimensional monitoring network and establish communication with mobile network through the femtocell, and the signal processing unit calculates and simulates positions, directions and distances of the user equipments using a radio resource control protocol and an assisted global positioning system protocol, to form the monitoring area.

2. The femtocell as claimed in claim 1, wherein the gateway is a packet data gateway and is used as a protocol converter for the benefit of protocol servers, in providing protocol conversion, routing and data exchange in relation to communication between the femtocell and the mobile network, and the mobile network is capable of providing and delivering voice and data access services to the femtocell.

3. The femtocell as claimed in claim 1, wherein the IMSI codes correspond to the user equipments to identify and authenticate valid user equipments and deny unrecognized or invalid user equipments, when the IMSI code of a user equipment is in the whitelist, the user equipment is recognized and is allowed to access the monitoring area.

4. The femtocell as claimed in claim 1, wherein when the user equipment enters a predetermined service coverage range of the femtocell and tries to access the mobile network through the gateway, the signal processing unit determines whether the IMSI code of the user equipment exists in the whitelist or nor, if the IMSI code of the user equipment exists in the whitelist, the femtocell allows the valid user equipments to access the mobile network and establish communication with the mobile network through the femtocell and the gateway.

5. The femtocell as claimed in claim 4, wherein when whitelist does not comprises that particular item of the user equipment, the invalid item of user equipment is denied, and the signal processing unit sends a corresponding control signal to the motoring unit, and the monitoring unit monitors and positions the invalid item of user equipment according to the control signal to determine whether the invalid item of user equipment enters the preset monitoring area.

6. The femtocell as claimed in claim 5, wherein when the invalid user equipment enters the predetermined monitoring area, the monitoring unit continues to monitor the invalid item of user equipment, and outputs a corresponding warning signal and/or message to issue an alert to prevent the invalid item of user equipment from entering the monitoring area, and inform the monitoring person that an item of invalid user equipment is accessing or attempting to access the monitoring area.

7. A femtocell in electronic communication with different user equipments via a wireless network, the femtocell comprising:
a setting unit that sets and provides a corresponding monitoring area to monitor the user equipments;
a subscriber identity module (SIM) that stores an approved list, the approved list comprising a plurality of identification (ID) codes corresponding to the user equipments;
a signal processing unit that is electrically connected to the setting unit and the SIM, the signal processing unit controlling the setting unit and the SIM; and
a monitoring unit that is electrically connected to the signal processing unit, wherein when a user equipment enters a predetermined service coverage range of the femtocell, the signal processing unit determines whether the ID code of the user equipment exists in the approved list, if the ID code of the user equipment is without in the approved list, the signal processing unit generates and sends a corresponding control signal to the monitoring unit, and the monitoring unit positions and monitors the user equipment according to the control signal to determine whether the user equipment has entered the preset monitoring area;
wherein the femtocell communicates with a gateway though a wireless network or a wired connection to establish communication connection, the femtocell is further in electronic communication with a mobile network through the gateway, the user equipments can access the mobile network through the femtocell and the gateway, the ID codes are International mobile subscriber identification (IMSI) codes;
and wherein the user equipments are positioned at corresponding predetermined places to form a three-dimensional monitoring network and establish communication with mobile network through the femtocell, and the signal processing unit calculates and simulates positions, directions and distances of the user equipments using a radio resource control protocol and an assisted global positioning system protocol to form the monitoring area.

8. The femtocell as claimed in claim 7, wherein the gateway is a packet data gateway and is used as a protocol converter for the benefit of protocol servers comprising protocol conversion, routing and data exchange for the communication between the femtocell and the mobile network, and the mobile network is capable of providing and delivering voice and data access services to the femtocell.

9. The femtocell as claimed in claim 7, wherein the IMSI codes correspond to the user equipments to identify and authenticate valid user equipments and deny invalid or unrecognized user equipments, when the IMSI code of a user equipment is in the whitelist, the user equipment is recognized and is allowed to access the monitoring area.

10. The femtocell as claimed in claim 7, wherein when the user equipment enters a predetermined service coverage range of the femtocell and tries to access the mobile network through the gateway, the signal processing unit determines whether the IMSI code of the user equipment exists in the whitelist or nor, if the IMSI code of the user equipment exists in the whitelist, the femtocell allows the valid user equipments to access the mobile network and establish communication with the mobile network through the femtocell and the gateway.

11. The femtocell as claimed in claim 10, wherein when the invalid user equipment enters the predetermined monitoring area, the monitoring unit continues to monitor the invalid item of user equipment, and outputs a corresponding warning signal and/or message to issue an alert to prevent the invalid item of user equipment from entering the monitoring area and inform the monitoring person that an invalid user equipment is accessing or attempting to access the monitoring area.

12. A monitoring method for monitoring user equipments, the monitoring method comprising steps of:
establishing and prestoring a predetermined whitelist list by a subscriber identity module (SIM) of a femtocell;
determining whether International mobile subscriber identification (IMSI) codes of the user equipments exist in the whitelist or not by a signal processing unit when the user equipments enter the coverage range of the femtocell;
sending a corresponding control signal to a monitoring unit by the signal processing unit; and
enabling and controlling the monitoring unit to monitor and position the user equipments according to the control signal;
wherein the femtocell communicates with a gateway though a wireless network or a wired connection to establish communication connection, the femtocell is further in electronic communication with a mobile network through the gateway, the user equipments can access the mobile network through the femtocell and the gateway, the ID codes are International mobile subscriber identification (IMSI) codes;
and wherein the user equipments are positioned at corresponding predetermined places to form a three-dimensional monitoring network and establish communication with mobile network through the femtocell, and the signal processing unit calculates and simulates positions, directions and distances of the user equipments using a radio resource control protocol and an assisted global positioning system protocol to form the monitoring area.

13. The monitoring method as claimed in claim 12, further comprising establishing a monitoring area by a setting unit of the femtocell to monitor the user equipment.

14. The monitoring method as claimed in claim 12, further comprising allowing the user equipments to access and establish communication with a mobile network through the femtocell when the IMSI code of the user equipment exists in the whitelist.

15. The monitoring method as claimed in claim 12, further comprising determining whether the user equipments have entered the preset monitoring area.

16. The monitoring method as claimed in claim 15, further comprising outputting a corresponding warning signal.

* * * * *